Patented May 7, 1968

3,382,226
PROCESS FOR THE PREPARATION OF KETONES AND ALDEHYDES
Phillip S. Landis, Woodbury, N.J., assignor to Mobil Oil Corporation, a corporation of New York
No Drawing. Filed Mar. 17, 1965, Ser. No. 440,618
24 Claims. (Cl. 260—94.9)

The present invention relates to a process for the preparation of ketones and aldehydes, and more specifically to a process for preparing a compound having the generic structural formula

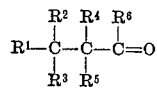

in which $R^1$, $R^2$ and $R^3$ are the same or different and selected from the group consisting of hydrogen, halogen, cyano, carboxyl and hydrocarbyl; in which $R^4$, $R^5$ and $R^6$ are the same or different and selected from the group consisting of hydrogen, alkyl, alkenyl, aryl, alkaryl and aralkyl; in which $R^1$, when $R^1$ and $R^2$ are hydrocarbyl, can be directly attached to $R^2$ in a cyclic configuration; and in which $R^4$, when $R^4$ and $R^6$ are other than hydrogen, can be directly attached to $R^6$ in a cyclic configuration.

It is well known that saturated organic compounds and saturated groups contained in organic compounds are generally characterized by comparatively low reactivity. That is, saturated organic compounds and groups are, respectively and in general, significantly less reactive than otherwise similar unsaturated compounds and groups. As a consequence of such characteristically low reactivity, the conversion of a saturated group contained in an organic compound to an aldehyde or ketone structure has been heretofore possible only with great difficulty, for example, by the process of oxidizing alkanes first to alcohols and then to aldehydes and/or ketones, which process has the disadvantage of requiring either undesirably high temperatures (e.g., 550–600° C. for oxidation with air in the presence of a copper or silver catalyst) or an oxidizing agent (e.g., dichromic acid) of such great strength that all but lower aldehydes would be rapidly further oxidized to acid products.

It has now been discovered that ketones and aldehydes having the generic structural formula described hereinbefore can be prepared by reacting an organic compound having the structural formula

in which $R^1$, $R^2$ and $R^3$ are the same or different and selected from the group consisting of hydrogen, halogen, cyano, carboxyl and hydrocarbyl, and in which $R^1$, when $R^1$ and $R^2$ are hydrocarbyl, can be directly attached to $R^2$ in a cyclic (e.g., alicyclic) configuration, with a vinyl ether having the structural formula

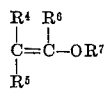

in which $R^4$, $R^5$ and $R^6$ are the same or different and selected from the group consisting of hydrogen, alkyl, alkenyl, aryl, alkaryl, and aralkyl, in which $R^7$ is selected from the group consisting of alkyl, alkenyl, aryl, alkaryl and aralkyl, and in which $R^4$, when $R^4$ and $R^6$ are other than hydrogen, can be directly attached to $R^6$ in a cyclic (e.g., alicyclic) configuration, under free radical initiating conditions sufficient to break the $R^7$-oxygen bond in the vinyl ether.

The organic compounds which can be reacted with a vinyl ether in the process of this invention are those which contain at least one saturated carbon atom having at least one hydrogen atom attached thereto, including saturated organic compounds such as alkanes, cycloalkanes and polyalkenes, unsaturated organic compounds such as alkenes, dialkenes, cycloalkenes, cyclodienes, alkylaromatics, alkenylaromatics, cycloalkylaromatics, cycloalkenylaromatics, polyarylalkenes and polydialkenes, and any of the foregoing types of saturated and unsaturated organic compounds having any number of halogen, cyano and/or carboxyl substituents consistent with the presence of at least one hydrogen atom attached to a saturated carbon atom in the organic compound.

Specific examples of saturated organic compounds to which the process described herein is applicable include methane, ethane, propane, butane, isobutane and other alkanes containing up to twenty or more carbon atoms; cyclopropane, cyclobutane, cyclopentane, cyclohexane, decalin and other cycloalkanes and dicycloalkanes containing up to twelve or more carbon atoms; polyethylene, polypropylene, poly-1-butene and other polymers formed by the polymerization reaction of one or more alkenes; and any of such alkanes, cycloalkanes and polyalkenes having one or more halogen, cyano and/or carboxyl substituents, e.g., chloromethane, tribromomethane, cyclohexylchloride, polyvinylchloride, methyl cyanide, cyclohexylcyanide, acetic acid, chloroacetic acid, cyanoacetic acid, etc.

Specific examples of unsaturated organic compounds to which the hereindescribed process is applicable include propene, 1-butene, 2-butene, isobutene, pentadiene and other alkenes and dialkenes containing up to twenty or more carbon atoms; cyclopentene, cyclohexene, cyclopentadiene, dicyclopentadiene and other cycloalkenes, cyclodienes, dicycloalkenes and dicyclodienes containing up to twelve or more carbon atoms; 1,2,3,4-tetrahydronaphthalene (tetralin) and other hydronaphthalenes; toluene, xylene, mesitylene, durene, pentamethylbenzene, hexamethylbenzene and other benzenes having from one to six ethyl, propyl, propenyl, butyl, butenyl or other alkyl or alkenyl ring substituents each containing up to twenty or more carbon atoms; alpha-methylnaphthalene and other naphthalenes having from one to eight alkyl or alkenyl ring substituents each containing up to twenty or more carbon atoms; polystyrene, poly(alpha-alkylstyrene) in which the alpha-alkyl group contains one to eight or more carbon atoms, polybutadiene and other polymers formed by polymerization of one or more vinyl benzenes, one or more dialkenes, or copolymerization of one or more vinyl benzenes, one or more alkenes, and/or one or more dialkenes; and any of such alkenes, cycloalkenes, arylalkanes, arylalkenes, and unsaturated polymers having one or more halogen, cyano and/or carboxyl substituents, e.g., 3 - chloropropene, benzylbromide, α-naphthyl chloride, poly(α-chlorostyrene), 3-cyanopropene, phenylacetonitrile, vinylacetic acid, phenylacetic acid, etc.

The process of this invention is also applicable to derivatives of any of the foregoing specific compounds containing one or more of various other substituents which would not prevent reaction of that derivative in accordance with the process of this invention, and to a starting material which includes two or more of the foregoing saturated and/or unsaturated organic compounds. Although use of a particular one of the foregoing organic compounds may be required for preparation of a desired aldehyde or ketone product, alkanes containing up to twenty or more and particularly from 12 to 20 carbon atoms are especially well suited for use in the process of this invention, as are alkylbenzenes, and particularly benzenes having at least one alkyl substituent containing from one to six carbon atoms.

The vinyl ethers which are useful in the process of this invention includes any vinyl ether containing the characteristic

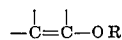

group, in which the —OR group is attached to one of two carbon atoms linked together by a true double bond, i.e. a bond such as is found in an alkenyl or cycloalkenyl structure, and in which R is selected from the group consisting of alkyl, alkenyl, aryl, alkaryl and aralkyl. Thus the vinyl ether useful in this process can be of relatively simple structure, e.g. a vinyl alkyl ether or a divinyl ether, or it can be of a more complicated structure, e.g. an alpha-alkoxyvinylbenzene such as alpha-alkoxystyrene, or an alkoxycycloalkene or alkoxycyclodiene in which the alkoxy group is attached to a carbon atom adjacent to a double bond in the cycloalkene ring.

Specific examples of suitable vinyl ethers include vinyl methyl ether, vinyl ethyl ether, vinyl propyl ether, and other vinyl alkyl ethers containing up to eight or more carbon atoms in the alkyl group; vinyl benzyl ether, benzyl vinyl methyl ether, benzyl vinyl ethyl ether; vinyl ether and other divinyl ethers containing aryl or alkyl substituents containing up to eight or more carbon atoms; alpha-methoxystyrene, alpha-ethoxystyrene, and other alpha-alkoxyvinylbenzenes in which the alkoxy group contains up to eight or more carbon atoms; 1-methoxycyclopentene, 1-methoxycyclohexene, 1-methoxycycloheptene, 1-methoxycyclopentadiene, 1-ethoxycyclohexene, and other 1-alkoxycycloalkenes in which the alkoxy group contains up to eight or more carbon atoms and the cyclic or dicyclic group contains up to ten or more carbon atoms; 1-benzoxycyclohexene and other 1-aryloxycycloalkenes in which the cycloalkenyl group contains up to eight or more carbon atoms; as well as other similar vinyl ethers containing one or more of various other substituents which would not prevent reaction of the vinyl ether in accordance with the process of this invention. A mixture of two or more of such vinyl ethers can also be used in the process of this invention.

The specific vinyl ether most desirable for reaction with one of the foregoing organic compounds will generally depend on the specific aldehyde or ketone product desired. In general, it is preferred for purposes of good reaction yield that the alkyl, alkenyl, aryl, alkaryl or aralkyl group ($R^7$) in the —OR group of the vinyl ether is characterized by an affinity for hydrogen sufficient to remove a hydrogen atom from at least one saturated carbon atom in the organic compound with which the vinyl ether is to be reacted. When the alkane, alkene, aromatic, or alkyl-aromatic by-product of the aldehyde or ketone prepared by this process will be essentially a waste product, it will also be preferred to utilize a vinyl ether in which the hydrocarbon ($R^7$) group in the —OR group of the ether is a relatively inexpensive group, e.g. a lower alkyl group such as a methyl group. Alpha-alkoxyvinylbenzenes (particularly alpha-alkoxystyrenes such as alpha-methoxy styrene) and 1-alkoxycycloalkenes (particularly 1-alkoxycyclohexenes such as 1-methoxycyclohexene) are especially well suited for use in the process described herein.

The subject process is carried out under free radical initiating conditions sufficient to break the $R^7$-oxygen bond in the vinyl ether. Such conditions can include the use of an elevated temperature, radiant energy such as ultraviolet or visible light, other radiation sources such as cobalt 60, a chemical reaction initiator such as a peroxide (e.g. an alkyl peroxide such as methyl peroxide), or two or more of such free radical initiators. When only thermal free radical initiation is used, the reaction temperature will generally be between about 150° and about 400° C. and most frequently between about 200° and about 300° C. The temperature best suited to reaction of specific starting materials will depend on their reactivities, and especially on the ease with which the hydrocarbon group ($R^7$) can be separated from the oxygen atom of the vinyl ether, physical properties of the starting materials, e.g. their boiling points, and the concentration or intensity of other free radical initiators used together with an elevated reaction temperature. When used together with another free radical initiator such as ultraviolet or visible light, temperature as low as about 80° C. or lower will be high enough for use with relatively more reactive starting materials. In general, an increase in temperature within the aforedescribed ranges will accelerate the reaction, as will an increase in the concentration of a chemical initiator or in the intensity of light or other radiation used as a free radical initiator. When visible or ultraviolet light is used, it is preferred to carry out the reaction in a quartz reaction vessel.

It is generally suitable to carry out the reaction at reflux and about atmospheric pressure, although an elevated pressure may be preferred with certain starting materials, depending on their boiling points. When the reaction is conducted at relatively low pressure, e.g. near atmospheric pressure, it is usually desirable to utilize a condenser to remove the byproduct of the aldehyde or ketone (e.g. methane when the vinyl ether is a methoxy compound such as alpha-methoxystyrene), while returning reflux condensate to the reaction vessel. The process can be conducted as a continuous process or as a batch operation. In either case, the reactants can be passed into the reaction vessel in a suitable diluent, although it is generally preferred that the reactants be combined without an extraneous diluent, and with the use of a large excess of the organic compound over that necessary for complete reaction with the vinyl ether in the reaction mixture. The use of an inert gas, e.g. nitrogen, as the reaction environment is also generally desirable since, in some cases, the presence of oxygen may inhibit the reaction.

Although the process of this invention should not be understood as being limited thereto, it is believed that the process in most cases includes the following free radical chain reaction:

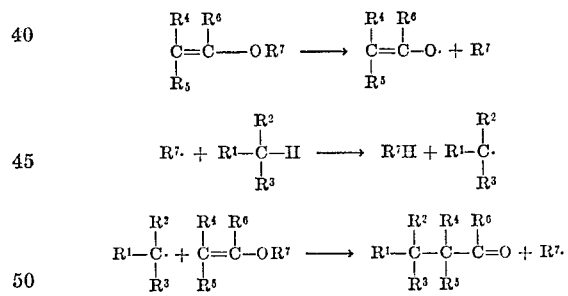

in which $R^1$, $R^2$ and $R^3$ are the same or different and selected from the group consisting of hydrogen, halogen, cyano, carboxyl and hydrocarbyl; in which $R^4$, $R^5$ and $R^6$ are the same or different and selected from the group consisting of hydrogen, alkyl, alkenyl, aryl, alkaryl and aralkyl; in which $R^7$ is selected from the group consisting of alkyl, alkenyl, aryl, alkaryl and aralkyl; in which $R^1$, when $R^1$ and $R^2$ are hydrocarbyl, can be directly attached to $R^2$ in a cyclic configuration; and in which $R^4$, when $R^4$ and $R^6$ are other than hydrogen, can be directly attached to $R^6$ in a cyclic configuration.

Thus for example, when $R^6$ in the vinyl ether is aryl, e.g. in a vinyl benzene having the —OR$^7$ group in the alpha position, and the process described herein provides an aryl ketone product, it is believed that the reaction proceeds as follows:

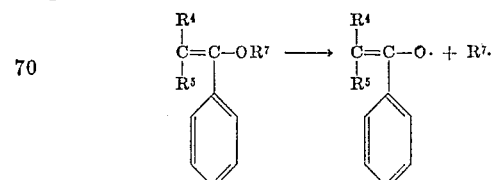

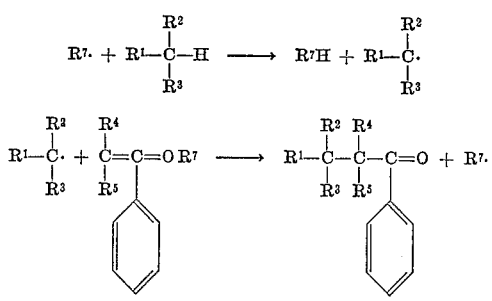

in which $R^1$, $R^2$, $R^3$, $R^4$, $R^5$ and $R^7$ have the aforedescribed significance.

Also for example, when $R^4$ is ethyl ($-CH_2-CH_2-$), $R^5$ is hydrogen; $R^6$ is ethyl ($-CH_2-CH_2-$) and $R^4$ is directly attached to $R^6$ in a cyclohexene configuration having an $-OR$ substituent in the 1-position (adjacent to the double bond in the ring), and the process described herein provides a cyclic ketone product, i.e., cyclohexane having a ring substituent in the 2-position, it is believed that the reaction proceeds as follows:

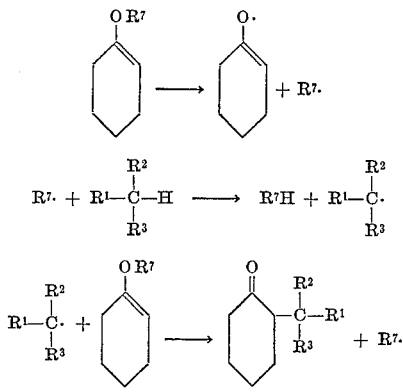

in which $R^1$, $R^2$, $R^3$ and $R^7$ have the aforedescribed significance.

A great variety of aldehydes and ketones can be produced by the process of this invention. If $R^6$ in the vinyl ether is hydrogen, the reaction product will be an aldehyde. Otherwise, when $R^6$ is alkyl, alkenyl, aryl, alkaryl or aralkyl, the reaction product will be a ketone.

The following specific examples are for the purpose of illustrating the process of this invention. It should be understood that this invention is not limited to the specific reactants or reaction conditions used in the examples. Other vinyl ethers, other organic compounds containing at least one saturated carbon atom having at least one hydrogen atom directly attached thereto, and other reaction conditions, as defined hereinbefore, can also be used, as those skilled in the art will readily appreciate.

Example I

A mixture of 1.07 grams of alpha-methoxystyrene and 8.45 grams of toluene was sealed in a pyrex tube under a nitrogen atmosphere. The tube was placed in a circular heater and heated at 250° C. for 24 hours. The tube was then broken, relieving considerable methane gas pressure. The contents were distilled free of starting materials and propiophenone by-product and the yellow semi-solid residue was digested with 15 ml. of methanol. Cooling the methanol solution in an ice bath produced white crystals which were separated by suction filtration and found to weigh 0.6 gram (35% of the theoretical yield based on the amount of alpha-methoxystyrene used), and to have a melting point of 71–73° C. The infrared spectrum of the product showed a string carbonyl band at 5.90 microns and was identical to the spectrum of a sample of beta-phenylpropiophenone, M.P. 71–72° C., which was prepared by palladium-catalyzed hydrogenation of benzylidene-acetophenone. The mixed melting point of the product with betaphenylpropiophenone showed no melting point depression.

Example II

A mixture of 13.2 grams of Tetralin and 6.77 grams of alpha-methoxystyrene was heated in a 25 milliliter flask under light reflux, in a nitrogen atmosphere and at 200–210° C. for ten hours. The reacted mixture was found to include a 36% yield (based on the amount of alpha-methoxystyrene used) of a product having a boiling point of 190–195° C. at 0.05 millimeter of mercury. The infrared spectrum of the product was consistent with that of tetralylacetophenone. The nuclear magnetic resonance spectrum, which also corresponded to that of tetralylacetophenone, revealed two aryl multiplets (area=4.1 at 7.45 p.p.m. and area=5.0 at 6.68 p.p.m.) and overlapping methylene protons (area=9.5 in the 1.2 to 3.2 p.p.m. region).

Example III

A mixture of 5.6 grams of 1-methoxycyclohexene and 16.2 grams of hexamethylbenzene were heated under light reflux at 180° C. for 24 hours. Methane gas was observed as a reaction by product. Crystals which separated on cooling the solution at room temperature were recrystallized three times from ethanol and found to melt at 121–123° C. The nuclear magnetic resonance spectrum of the product revealed methyl protons (area=15.1 at 2.1 p.p.m.), methylene protons (area=2.0 at 2.8 p.p.m.) and cyclohexyl protons (area=9.1, broad multiplet at 2.0 to 1.1 p.p.m.). These results are consistent with the structure:

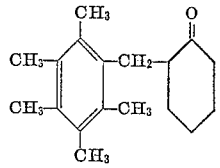

Example IV

A mixture of 29.25 grams of phenylacetonitrile and 6.7 grams of alpha-methoxystyrene was heated under reflux at 210–220° C. for 30 hours. Evolution of methane gas was observed. The liquid product was distilled at 0.5 millimeter of mercury and 3.71 grams of a fraction boiling at 155–165° C. was collected. This fraction solidified on standing and melted at 120–122° C. after recrystallization from acetone. This product was identified as beta-benzoyl-alpha-phenylacetonitrile (reported melting point 124° C.) by its infrared spectrum (carbonyl at 5.90 microns and a cyano group at 4.43 microns), its nuclear magnetic resonance spectrum (aryl multiplet=10 protons at 7.20 to 8.05 p.p.m., methylene doublet=2 protons at 3.58 p.p.m. and a C-H triplet=1 proton at 4.49 p.p.m.) and by hydrolysis to beta-phenyl-alpha-benzoylacetic acid (melting point 155° C., neutralization equivalent 255; reported melting point 157° C., neutralization equivalent 254).

Example V

A mixture of 4.86 grams of hexamethylbenzene and 4.02 grams of alpha-methoxystyrene was heated in a 25 milliliter flask under light reflux in a nitrogen atmosphere and at 220 to 250° C. for ten hours. Methane gas was eliminated through a condenser which returned liquid condensate to the reaction flask. The product was subjected to fractional recrystallization which separated 1.8 grams of a solid melting at 108–128° C., 3.2 grams of a solid melting at 115–165° C., and 0.4 grams of a solid melting at 124–126° C. The fraction of intermediate melting range was found to be mixture of unreacted hexamethylbenzene and a ketone. The fraction having the highest melting range was found by vapor phase chromatography to contain a single compound in which infrared spectroscopy showed the presence of a carbonyl group. Nuclear magnetic resonance showed aryl protons (area=5.1, multiple resonance at 7.3 to 7.7 p.p.m.), methylene protons (area=4.9 at 2.8 to 2.9 p.p.m.) and methyl protons (area=15.3 at 1.8 and 2.1 p.p.m.).

Example VI

A mixture of 9 grams of hexadecane and 5.36 grams of alpha-methoxystyrene was heated to reflux in a 50 milliliter flask. 128 milliliters of methane envolved during the first three hours, after which the reaction was allowed to proceed at light reflux for an additional 14 hours. The crude product was distilled free of unreacted starting materials by heating to 200° C. at 0.5 millimeter of mercury. The residue was dissolved in benzene and eluted through 50 grams of activated alumina. Two major chromatographic fractions were collected, the first weighing 1.58 grams and boiling at 210–212° C. at 0.05 mm. and the second weighing 3.64 grams and boiling at 225–230° C. at 0.05 mm. Both fractions had strong carbonyl bands in their infrared spectra.

Example VII

A mixture of 5 grams of polyethylene having a melting point of 150° C. and 2.7 grams of alpha-methoxystyrene was heated at 220° C. for four hours in a nitrogen atmosphere. The slightly yellow polymer was separated from the reacted mixture on cooling and thereafter treated with hot benzene and with methanol. After drying in a vacuum oven at 100° C., the polymer was white and showed strong carbonyl absorption in the infrared spectrum at 5.88 microns.

Example VIII

Two mixtures, each consisting of 10 grams of toluene and 2 grams of alpha-methoxystyrene, were separately placed in quartz tubes and refluxed in nitrogen atmospheres. During reflux, one of the reaction mixtures was irradiated with ultraviolet light from a Hannovia lamp for 16 hours. Vapor phase chromatography and infrared spectroscopy established that the reaction in the irradiated mixture had resulted in a 5% conversion of the ether to carbonyl-containing compounds, while substantially no carbonyl-containing compounds resulted in the mixture not subjected to irradiation.

Example IX

The run in Example 8 which included irradiation of the reaction mixture was repeated but with only 4 grams of toluene initially present in the reaction mixture instead of 10 grams. Vapor phase chromatography and infrared spectroscopy showed a 2% conversion of the ether to carbonyl-containing compounds.

Example X

A mixture of 4.52 grams of hexadecane and 2.68 grams of alpha-methoxystyrene were placed in a 50 milliliter flask fitted with a thermometer and a reflux condenser. A gas burette was attached to the condenser to collect any gaseous reaction products. The flask contents were heated under reflux to 225–228° C. and methane evolution was measured as a function of time, with the following results.

| Time, minutes: | Volume of methane evolved, mil. |
| --- | --- |
| 7 | 2.3 |
| 16 | 4.7 |
| 21 | 6.7 |
| 29 | 9.8 |
| 38 | 13.7 |
| 48 | 17.7 |
| 108 | 38.8 |

Example XI

Two mixtures, the first containing 0.01 mole of hexamethylbenzene, the second containing 0.01 mole of hexaethylbenzene, and each containing 0.01 mole of alpha-methoxystyrene, were separately placed in 25 milliliter flasks fitted with thermometers, heating mantles, reflux condensers and gas burettes for measuring the evolution of gaseous reaction products. The reaction mixtures were heated to 225±5° C. and methane evolution was measured as a function of time, with the following results:

*Reaction of hexamethylbenzene with alpha-methoxystyrene*

| Time, minutes: | Volume of methane evolved, mil. |
| --- | --- |
| 13 | 0.3 |
| 28 | 2.7 |
| 40 | 4.2 |
| 60 | 6.7 |
| 86 | 9.0 |
| 121 | 11.2 |
| 132 | 12.7 |
| 258 | 14.9 |

*Reaction of hexaethylbenzene with alpha-methoxystyrene*

| Time, minutes: | Volume of methane evolved, mil. |
| --- | --- |
| 14 | 14.2 |
| 30 | 18.0 |
| 41 | 21.0 |
| 62 | 24.5 |
| 87 | 28.0 |
| 123 | 32.2 |
| 153 | 35.9 |

Example XII

A mixture of 4.52 grams of hexadecane and 2.68 grams of alpha-methoxystyrene was heated to 215–220° C. and the evolution of methane was measured as a function of time as in previous examples, with the following results.

| Time, minutes: | Volume of methane evolved, mil. |
| --- | --- |
| 5 | 2 |
| 16 | 8 |
| 26 | 15 |
| 36 | 18 |
| 44 | 22 |
| 51 | 25 |

After 56 minutes of reaction, the mixture was divided into two portions. To one portion, 2.5% of benzyldisulfide was added; to the other portion, 2.5% of 2,6-di-t-butyl-p-cresol was added. Thereafter, both portions were maintained at 215–220° C. and the portion to which the 2,6-di-t-butyl-p-cresol had been added after 56 minutes was irradiated beginning 105 minutes after initial reaction of the undivided mixture. Measurement of methane evolution from each portion was continued, with the following results (corrected to represent the proportionally larger quantity of methane which would have evolved from the undivided reaction mixture if it had been subjected to such irradiation and/or addition of a proportionally larger amount of the same reaction inhibitor):

*Mixture containing 2.5% benzyldisulfide*

| Time, minutes: | Volume of methane evolved, mil. |
| --- | --- |
| 61 | 32 |
| 65 | 36 |
| 70 | 40 |
| 75 | 44 |

*Mixture containing 2.5% 2,6-di-t-butyl-p-cresol*

| Time, minutes: | Volume of methane evolved, mil. |
|---|---|
| 60 | 29 |
| 70 | 32 |
| 81 | 34 |
| 91 | 34 |
| 101 | 34 |
| 111 | 34 |
| 120 | 34 |
| 130 | 34 |
| 136 | 35 |
| 141 | 35 |
| 150 | 37 |
| 160 | 39 |

Although the present invention has been described with preferred embodiments, it should be understood that resort may be had to modifications and variations thereof without departing from the spirit and scope of this invention, as those skilled in the art will readily understand. Such variations and modifications are therefore considered to be within the purview and scope of the appended claims.

I claim:
1. A process for preparing a compound having the generic structural formula

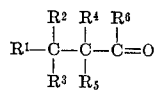

in which $R^1$, $R^2$ and $R^3$ are the same or different and selected from the group consisting of hydrogen, halogen, cyano, carboxyl and hydrocarbyl; in which $R^4$, $R^5$ and $R^6$ are the same or different and selected from the group consisting of hydrogen, alkyl, alkenyl, aryl, alkaryl and aralkyl; in which $R^1$, when $R^1$ and $R^2$ are hydrocarbyl, can be directly attached to $R^2$ in a cyclic configuration; and in which $R^4$, when $R^4$ and $R^6$ are other than hydrogen, can be directly attached to $R^6$ in a cyclic configuration; which process comprises reacting an organic compound having the structural formula

in which $R^1$, $R^2$ and $R^3$ have the aforedescribed significance, with a vinyl ether having the structural formula

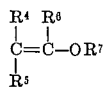

in which $R^4$, $R^5$ and $R^6$ have the aforedescribed significance and in which $R^7$ is selected from the group consisting of alkyl, alkenyl, aryl, alkaryl and aralkyl, under free radical initiating conditions sufficient to break the $R^7$-oxygen bond in said vinyl ether.

2. A process, as defined in claim 1, in which said organic compound is an aliphatic hydrocarbon.

3. A process, as defined in claim 2, in which said aliphatic hydrocarbon is an alkane containing from 12 to 20 carbon atoms.

4. A process, as defined in claim 3, in which said alkane is hexadecane.

5. A process, as defined in claim 1, in which said organic compound is a product obtained by polymerizing a polymerizable composition comprising at least one unsaturated hydrocarbon containing from two to four carbon atoms.

6. A process, as defined in claim 5, in which said organic compound is polyethylene.

7. A process, as defined in claim 1, in which said organic compound is an alkylaromatic compound.

8. A process, as defined in claim 7, in which said alkylaromatic compound comprises a benzene ring having from one to six alkyl substituents each containing from one to six carbon atoms.

9. A process, as defined in claim 8, in which said alkylaromatic compound is toluene.

10. A process, as defined in claim 8, in which said alkylaromatic compound is hexamethylbenzene.

11. A process, as defined in claim 8, in which said alkylaromatic compound is hexaethylbenzene.

12. A process, as defined in claim 1, in which $R^3$ is cyano.

13. A process, as defined in claim 12, in which said organic compound is phenylacetonitrile.

14. A process, as defined in claim 1, in which $R^1$ and $R^2$ are hydrocarbyl and $R^1$ is directly attached to $R^2$ in a cyclic configuration.

15. A process, as defined in claim 14, in which said organic compound is a hydronaphthalene.

16. A process, as defined in claim 15, in which said organic compound is tetralin.

17. A process, as defined in claim 1, in which said vinyl ether is an alpha-alkoxyvinylbenzene.

18. A process, as defined in claim 17, in which said vinyl ether is alpha-methoxystyrene.

19. A process, as defined in claim 1, in which said vinyl ether is a 1-alkoxycycloalkene.

20. A process, as defined in claim 19, in which said vinyl ether is 1-methoxycyclohexene.

21. A process, as defined in claim 1, in which said free radical initiating conditions comprise heating the reaction mixture containing said organic compound and said vinyl ether to between about 150° and about 400° C.

22. A process, as defined in claim 1, in which said free radical initiating conditions comprise exposing the reaction mixture containing said organic compound and said vinyl ether to radiant energy.

23. A process, as defined in claim 22, in which said radiant energy comprises electromagnetic waves having a wave length characteristic of the portion of the electromagnetic spectrum which comprises visible light and ultraviolet light.

24. A process, as defined in claim 1, in which said free radical initiating conditions comprise reacting said organic compound and said vinyl ether in the presence of a peroxide.

No reference cited.

JOSEPH L. SCHOFER, *Primary Examiner.*

L. EDELMAN, *Assistant Examiner.*

UNITED STATES PATENT OFFICE
CERTIFICATE OF CORRECTION

Patent No. 3,382,226                                  May 7, 1968

Phillip S. Landis

It is certified that error appears in the above identified patent and that said Letters Patent are hereby corrected as shown below:

Column 5, lines 5 to 12, right-portion of the formula reading      $C=OR^7$      should read      $C-OR^7$ line 20, "cyclohexane" should read -- cyclohexanone --. Column 6, line 23, "by product" should read -- by-product --. Column 7, line 9, "envolve" should read -- evolved --.

Signed and sealed this 16th day of September 1969.

(SEAL)
Attest:

Edward M. Fletcher, Jr.
Attesting Officer

WILLIAM E. SCHUYLER, JR.
Commissioner of Patents